United States Patent [19]

Oldham

[11] 3,983,772
[45] Oct. 5, 1976

[54] CUTTING MACHINE

[76] Inventor: Dale R. Oldham, 7028 N. 11th St., Phoenix, Ariz. 85020

[22] Filed: Sept. 26, 1975

[21] Appl. No.: 616,953

[52] U.S. Cl. .................................. 83/62.1; 83/245; 83/440.1; 83/444; 83/508; 83/580; 83/422; 83/436
[51] Int. Cl.² .................... B26D 5/20; B26D 3/16
[58] Field of Search ............ 83/167, 244, 245, 440, 83/440.1, 444, 448, 508, 580, 436, 62.1, 422

[56] References Cited
UNITED STATES PATENTS

| 2,707,026 | 4/1955 | Hoern | 83/580 X |
|---|---|---|---|
| 3,205,745 | 9/1965 | Hammer et al. | 83/580 X |
| 3,266,357 | 8/1966 | Littell | 83/244 X |
| 3,718,062 | 2/1973 | Gilvar | 83/440 X |

Primary Examiner—J. M. Meister

[57] ABSTRACT

The disclosure relates to a cutting machine and more particularly to a cutting machine for cutting off short lengths of elongated material such as circular in cross section wire-like or tubular elements and more particularly to material commonly known as liquid silver which is small diameter tubular silver elements used to make necklaces or the like. The machine comprises a means for feeding intermittently a plurality of elongated work pieces in parallel relationship to each other and for sequencially and intermittently operating a circular saw which moves laterally relative to the work pieces and cuts off short lengths thereof. The machine comprises means for automatically sequencing the feed means and the cut-off means in timed relation to each other and such that, as for example, as many as 30,000 to 70,000 pieces may be cut in 1 hour's time.

12 Claims, 13 Drawing Figures

CUTTING MACHINE

BACKGROUND OF THE INVENTION

Various machines have been utilized to cut off short lengths of wire-like or tubular elements at high speed and many of these machines have attempted to cycle the saw at high rate while rotating the saw at a very high rotational speed and cutting single work pieces sequencially in order to attain a high production rate. These machines which cycle the saw at such high rates in a direction laterally of the axis of the saw tend to provide high impact forces of the saw relative to the work in a lateral direction and as a result impose a very high stress and wear factor on the saw, sometimes breaking them while at the same time causing rough cuts of the material which is a particular disadvantage in the manufacture of silver necklace beads, commonly known as liquid silver which are short tubular pieces cut from elongated tubular pieces fed through the machine. Accordingly, many machines of the prior art have been difficult to maintain and have produced cuts which have required substantial tumbling or finishing operations in order to render them smooth enough for the threading thereof into necklaces or the like.

SUMMARY OF THE INVENTION

The present invention comprises a cutting machine having a material feed means provided with a feed roller having a plurality of feed grooves spaced longitudinally thereof and using a resilient roller adjacent thereto for holding the tubular silver parts in contact with the feed roller grooves and a means for actuating a rotary saw laterally relative to the tubular silver for cutting a plurality of short pieces therefrom, each time the saw is moved laterally relative to the plurality of grooved areas in the feed roller and this function of the saw may operate in both directions in a fore and aft reciprocal movement afforded by a sliding carriage on which the rotary saw is mounted. Thus, the saw may cut ten short pieces of silver when moving in one direction and another ten pieces when moving back in the opposite direction.

The invention comprises precision guide means to feed the silver into the feed roller and a receiving guide or receiver adapted to receive the strands from the feed rollers and to hold them in precise position so as to permit the saw to cut the silver in close proximity to the receiver as the silver is projected therethrough and disposed in cantilever disposition therebeyond.

The invention comprises a novel stretch belt drive adapted to drive a shaft upon which the saw is mounted while said shaft is carried on a movable carriage and while the saw drive motor is maintained in stationary position on the frame of the invention so as to provide nominal inertial loading on the carriage as it is rapidly moved back and forth and also to provide for the operation of said saw with a sufficiently powerful high speed motor so as to feed rapidly and cut a large number of pieces in rapid succession.

The invention also comprises a novel rotary crank mechanism for moving the saw carriage back and forth together with detent means for holding the carriage in certain position in the event it is decided to replace the saw on the respective shaft or arbor at times when the saw needs replacement after being worn or broken.

Additionally, the novel latching relay means is provided for sequencially energizing and latching the circuitry for operation of the motor operating the aforementioned feed roller and the motor for moving the carriage respectively such that the motors are operated rapidly in succession and intermittently relative to each other to first allow the feed roller to be operated for projecting the tubular silver in a cantilever relationship to the aforementioned receiving holder and to then operate the motor for moving the saw carriage relative to the tubular silver which is projected in cantilever relation from the receiving and holding body so as to cut off the silver at the desired lengths. Limit switch means is provided for causing the completion of the operation of one of the motors to energize the aforementioned relay to start operation of the other motor so that the feed roller operating motor and the carriage operating motor operate in sequence with each other automatically and in timed relationship on an intermittent basis.

The feed roller is operated in connection with its respective motor by a crank and connecting rod mechanism which actuates a lever coupled to an overrunning or sprag clutch which operates only in one direction and this sprag clutch rotates the feed roller aforementioned a predetermined distance so that each cycle of operation of the feed roller driving motor projects the silver a precise predetermined distance so that the precise length of the silver is held in cantilever position by the aforementioned receiver so as to control the length of pieces being cut by the saw.

The feed roll drive motor is controlled by one of the aforementioned limit switches and a brake so as to effectively operate it for a single revolution for each cycle of the feed roller and a lever arm coupled to a connecting rod operated by crank means in connection with the motor moves back and forth thereby actuating the sprag or overrunning clutch to move the feed roller a short distance each cycle of operation.

The lever connected to the sprag clutch is provided with a plurality of openings longitudinally thereon which may be used to accomadate a connection for the connecting rod to thereby adjust the levers and to thereby adjust the angular pivotal movement of the sprag clutch and respective rotary movement of the feed roller to thereby afford a selection of various lengths of material to be cut as driven by the feed roller.

Due to the fact that the machine feeds ten or more work pieces of silver in parallel relationship to each other, in a position to be cut by the saw at one pass of the carriage, the carriage speed may be relatively low in proportion to the number of pieces cut and consequently the carriage may be moved back and forth cutting ten pieces in each direction and with the cycle rate obtainable in the movement of the carriage without undue accelerative forces. The machine may cut as many as thirty to seventy thousand pieces in 1 hour's time, this being based on either cutting in one direction of the carriage or cutting pieces in both back and forth directional movements of the carriage and this high rate of production is attainable by the machine of the invention without undue impact forces or accelerative forces of the saw in relation to the work being cut and such that life expectancy of saws and related equipment of the machine is good whereby a minimum of down time and maintenance is required to maintain the aforementioned level of productivity of the machine of the invention.

Accordingly, it is an object of the invention to provide a very simple yet efficient machine for cutting parts from elongated work pieces such as silver tubing or the like.

Another object of the invention is to provide a machine which is capable of high production with a minimum of maintenance and down time and/or expenditure of cutting blades.

Another object of the invention is to provide a machine having a novel means for automatically cycling material feed roller means and saw carriage actuating means on an intermittent and successive basis so that the machine of the invention operates in a fully automatically manner.

Another object of the invention is to provide means by which the machine may be shut off in the event that a saw blade is broken; said means being a switch disposed so as to be contacted by the work pieces if they are extended a substantial distance by means of the feed rollers without being cut by the saw blade.

Another object of the invention is to provide a novel saw drive means whereby the carriage moveably transporting the saw moves relative to the saw drive motor and a flexible belt extends from the shaft of the drive motor to the arbor or shaft carrying the saw and which is rotateably mounted on the carriage such that the belt is capable of flexing and stretching and yet driving the saw efficiently while the saw driving motor is stationary on the frame of the machine.

Another object of the invention is to provide a cutting machine as aforementioned which is capable of high production of cut parts and yet which cuts parts neatly and cleanly so that a minimum of finishing is required and so that the parts may be smooth and accurate at their cut ends so that they when made into necklaces or the like provide very smooth transition or joinders of the ends of the parts as they are abutted to each other in a necklace assembly.

Other objects and advantages of the invention may be apparent from the following specification, appended claims and accompanying drawings.

DESCRIPTION OF THE PREFERRED EMBODIMENTS

Figure 1:
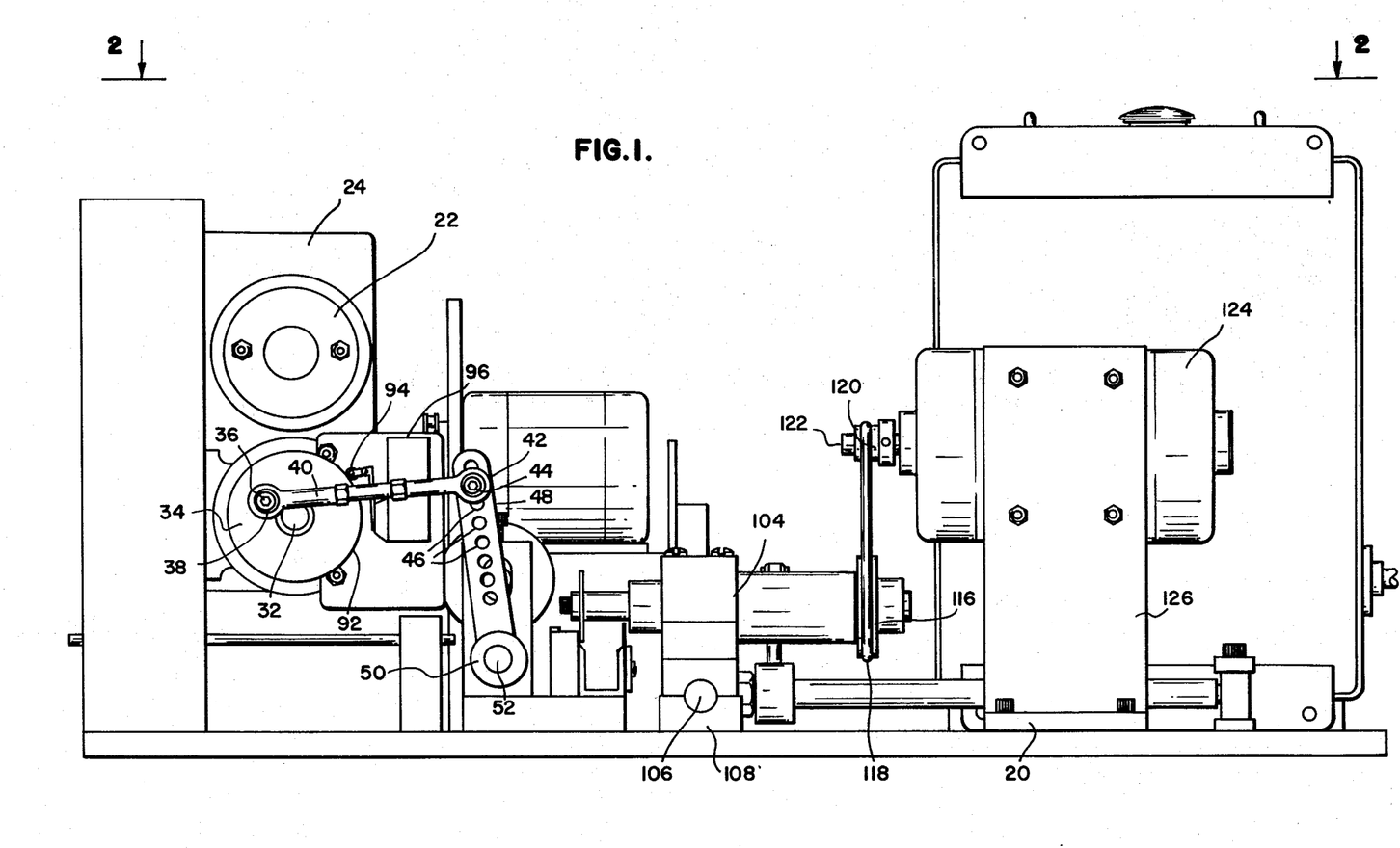
FIG. 1 is a side elevational view of the machine of the invention.
Figure 2:
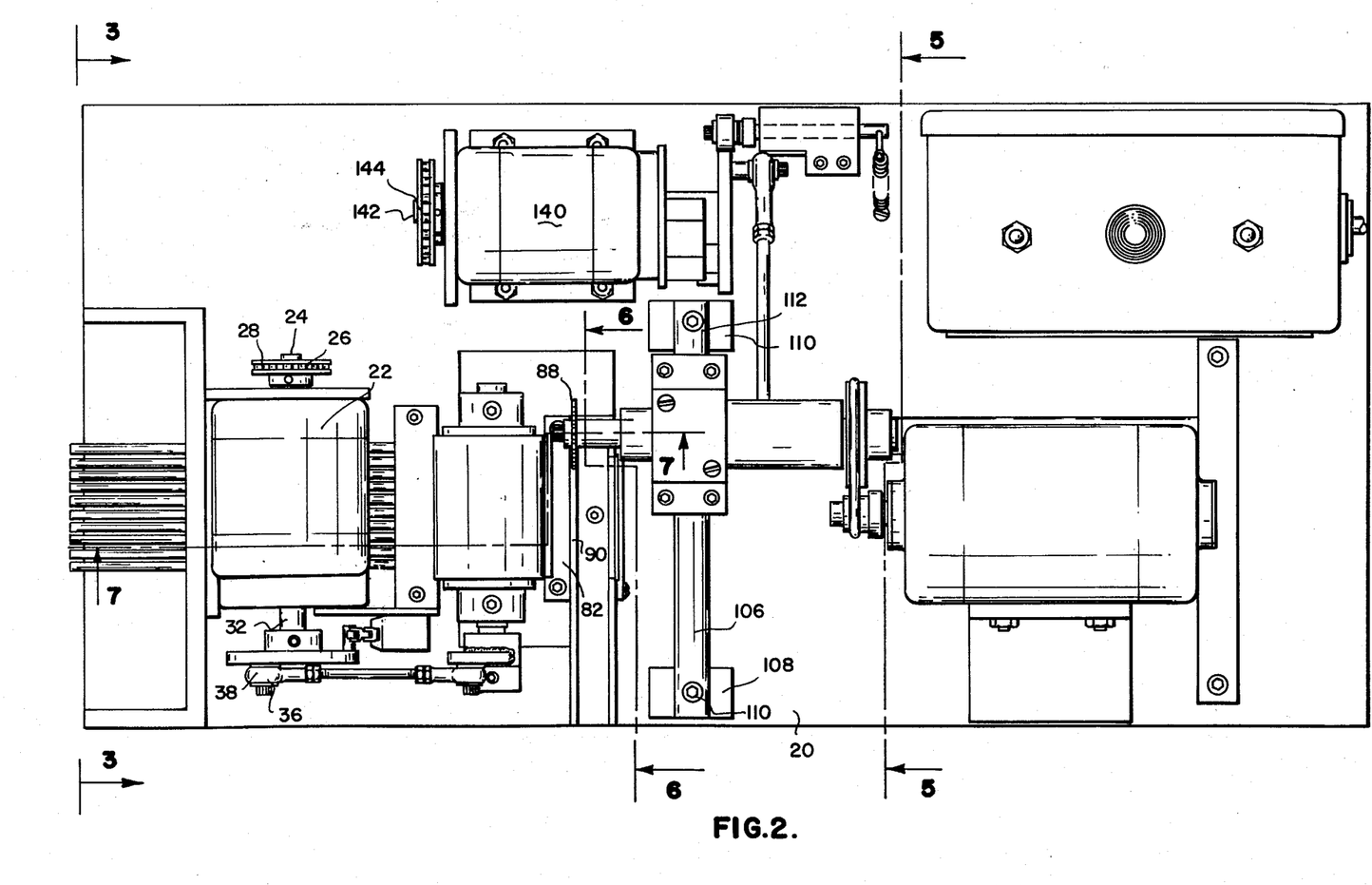
FIG. 2 is a top or planned view of the machine of the invention.
Figures 3, 4:
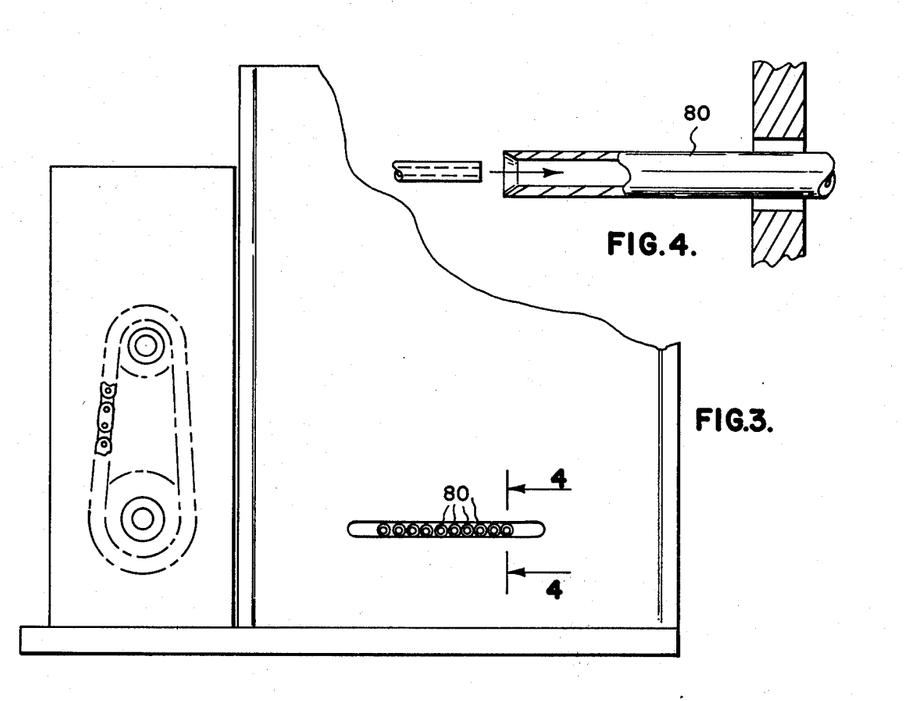
FIG. 3 is an enlarged fragmentary end view taken from the lone 3—3 of FIG. 2.
FIG. 4 is an enlarged fragmentary sectional view taken from the line 4—4 of FIG. 3.
Figure 5:
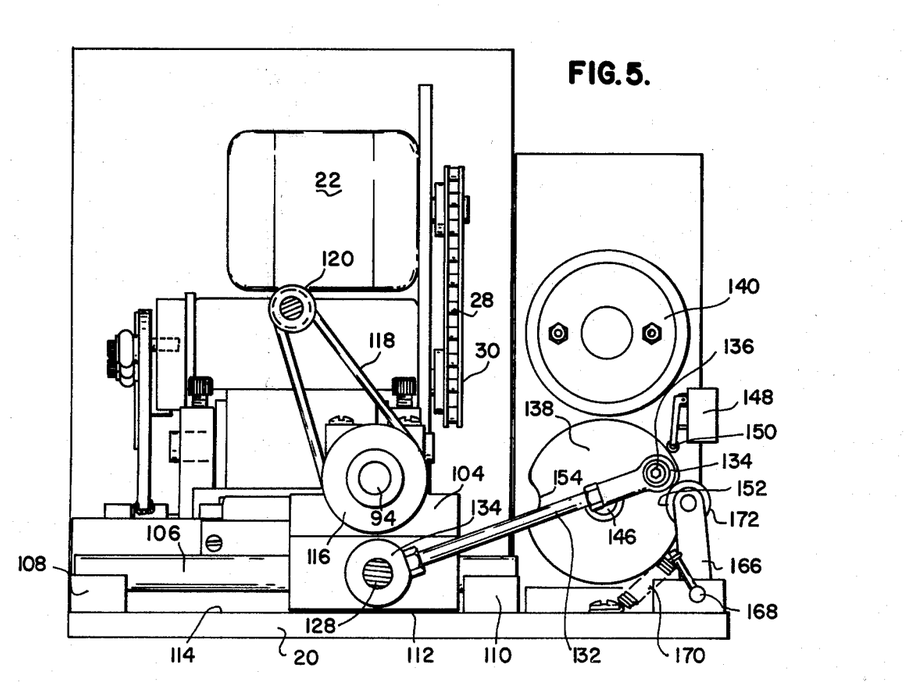
FIG. 5 is a fragmentary sectional view taken from the line 5—5 of FIG. 2.

As shown in FIGS. 1 and 2 of the drawings, the machine is provided with a frame 20 on which a motor 22 is mounted by means of an upstanding portion 24 of the frame. This motor 22 is provided with a shaft 24 having a sprocket 26 mounted thereon and a chain 28 engages the sprocket and, as shown in FIG. 5 of the drawings, the chain 28 engages another sprocket 30 on a crank shaft 32 which carries a crank wheel 34 provided with a crank pin 36 on which an end 38 of a connecting rod is rotatably mounted. The connecting rod is designated 40 and is provided with an opposite end 42 pivoted on a pin 44 which may be disposed in any one of several openings 46 of an actuating arm 48 which is provided with a sprag or overrunning clutch 50 at its lower end. This overrunning clutch 50 of the lower end of the arm 48 is shown in detail in FIG. 11 of the drawings and is a one-way sprag clutch adapted to operate or rotate a feed roll driving shaft 52 in only one direction as indicated by an arrow A in FIG. 11 of the drawings. The feed roll driving shaft 52 is rotatably mounted on the frame 20 in bearings 54 and 56 as shown best in FIG. 9 of the drawings. The feed roll shaft 52 is provided with an integral feed roll 58 which is provided with a plurality of annular and peripheral grooves 60 therein which are adapted to receive and feed tubular silver 62 which is held in engagement with the annular grooves 60 by means of an idler roller 64 having a resilient compressable peripheral portion 66 which bears on the tubular silver 62 and holds it firmly engaged in the annular grooves 60 of the feed roller 58.

Compressive force of the resilient portion 66 of the roller 64 is attained by adjusting screws 68 and 70 which are screw threaded in respective bearing mounts 72 and 74 and these screws bear down on the shaft 76 of the idler roller 64 so as to force the periphery 66 into firm engagement with the tubular silver 62 as it is frictionally driven in the annular grooves 60 of the feed roller 58.

Figures 9, 10:
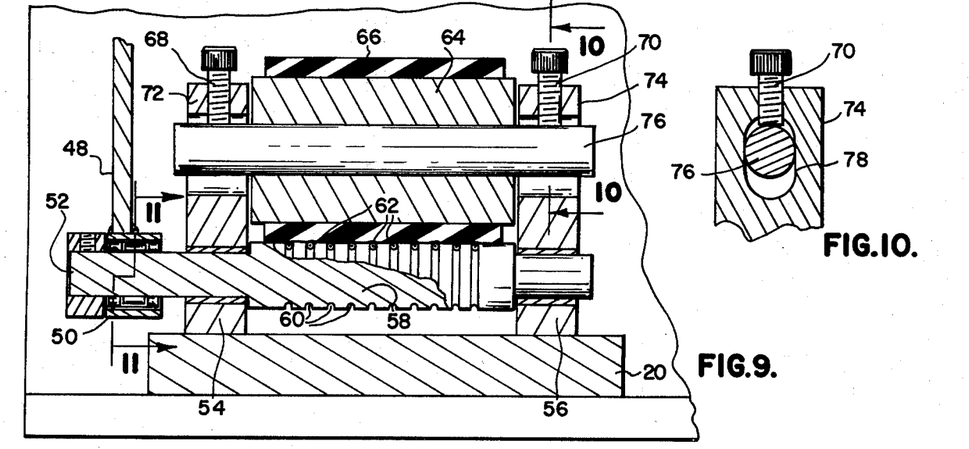
FIG. 9 is a fragmentary sectional view taken from the line 9—9 of FIG. 7.
FIG. 10 is an enlarged fragmentary sectional view taken from the line 10—10 of FIG. 9.

As shown in FIG. 10 of the drawings, the support 74 is provided with slotted portions 78 in which the shaft 76 may be vertically adjustably moved by means of the respective adjusting screws 68 and 70.

A plurality of work piece guide tubes 80 are hollow tubular members having their axis disposed at right angles to the axis of the feed roller 58 and these guide tubes 80 are adapted to guide the silver tubing 62 into precise alignment with the annular grooves 60 of the feed roller 58 and at the opposite side of the feed roller 58 is a receiver bar 82 having receiving openings 84 therein. These receiving openings 84 are adapted to receive the tubular silver 62 from the annular grooves 60 of the feed roller 58 and these receiver openings 84 hold the silver in cantilever relationship as indicated at 86 in FIG. 8 of the drawings so that a circular saw, shown by broken lines 88, may pass adjacent to a delivery side 90 of the receiver 82 and cut off the tubular silver 62 in accordance with the projected cantilever portion 86 thereof, as shown in FIG. 8 of the drawings.

As hereinbefore described, the openings 46 in the feed roller actuating lever 48 may be used to support the pin 44 of the connecting rod 42 in a variety of positions so as to vary the angular stroke of the arm 48 and consequently the degrees of rotation of the feed roller 58 and consequently the projected cantilever length 86 of the tubular silver 62 as may be desired. The tubular silver 62 is extruded material and is pulled into intake ends 90 of the guide tubes 80 as the feed roller 58 drives the tubular silver by means of the annular grooves 60 and the resilient peripheral portions 66 of the idler roller 64.

The crank wheel 34 hereinbefore described is provided with a peripheral portion 92 and this peripheral portion 92 is provided with suitably located regularities which are adapted to operate a roller arm 94 of a limit switch 96 energize an electric brake and to de-energize the motor 22 so as to stop the motor precisely after it has rotated one revolution which will account for a forward and backward movement of the lever 48 to complete the projection of the silver work pieces a desired distance as indicated by the cantilever portion 86 as hereinbefore described. Thus each cycle operation of the crank wheel 34 and the feed roller 52 accounts for the projection of the silver work pieces beyond the delivery side 90 of the receiver bar 82. Thus each time the motor 22 cycles the crank disc 34 and arm 48 together with the overrunning clutch 50 and the feed roller shaft 52, the feed roller 58 projects the pieces of silver tubing through the receiver openings 84 to a position beyond the delivery side 90 as indicated best in FIG. 8 wherein the cantilever portions 86 represent the length of the tubing projected into the path of the saw, as indicated by broken lines 88 in FIG. 8 of the drawings.

Figure 6:
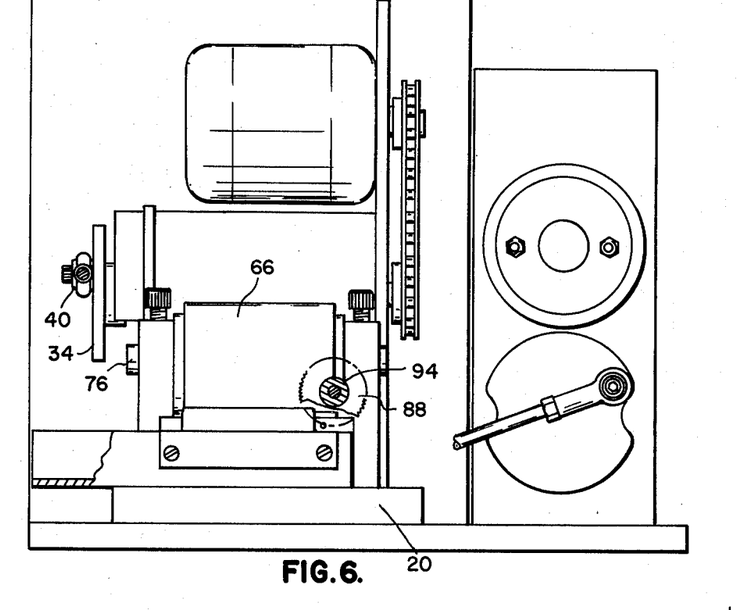
FIG. 6 is a fragmentary sectional view taken from the line 6—6 of FIG. 2.
Figure 7:
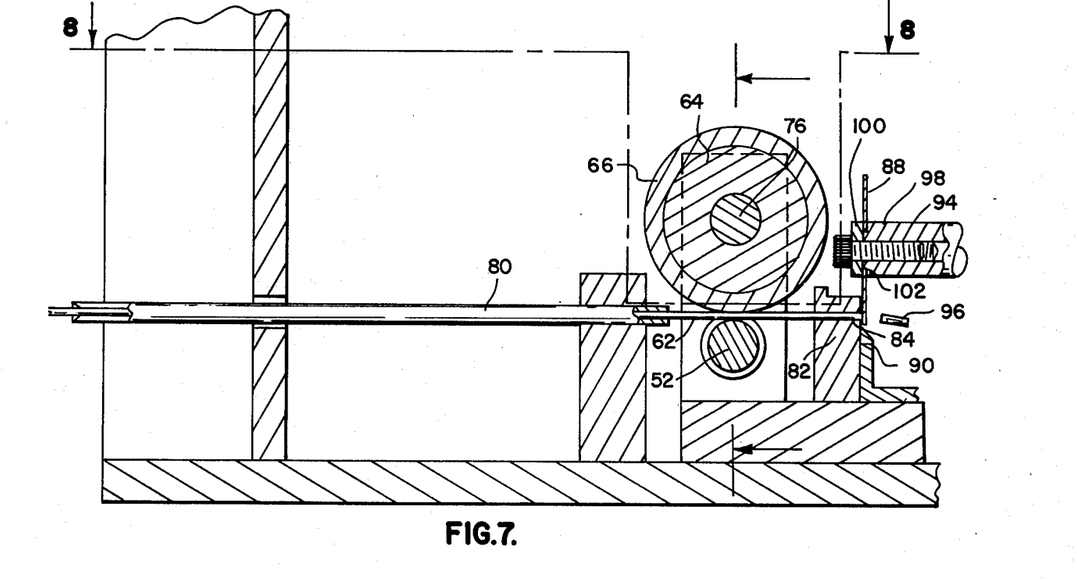
FIG. 7 is an enlarged fragmentary sectional view taken from the line 7—7 of FIG. 2.
Figure 8:
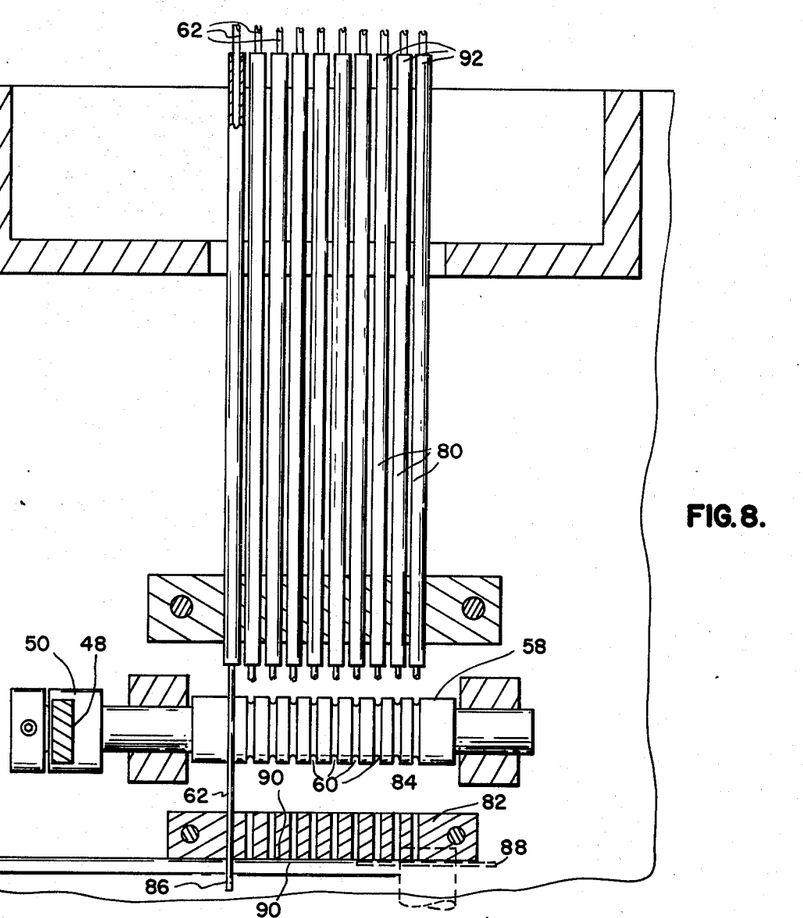
FIG. 8 is a sectional view taken from the line 8—8 of FIG. 7 showing parts and portions omitted to clarify the illustration.

As shown in FIG. 6 of the drawings, the saw 88 is mounted on a rotary arbor or shaft 94 and operates very closely to the delivery side 90 of the receiver 82 and when the arbor 94 is moved laterally relative to the axes of the silver guiding openings 84 in the receiver 82 short pieces of silver designated 96 are cut off from the silver 62 being held by the receiver 82, all as shown best in FIGS. 6 and 8 of the drawings.

The saw 88 is held on the arbor or shaft 94 by means of an allen screw 98 and a shoulder washer 100 and accordingly by removing the allen screw 98 and washer 100 the saw 88 may be placed on a reduced diameter portion 102 of the shaft 94 which holds it concentric therewith and clamped thereon by means of the washer 100 and the allen screw 98.

As shown best in FIGS. 1, 2 and 5 of the drawings, the shaft or arbor 94 which carries the circular saw 88 is rotatably mounted in a carriage 104 which moves longitudinally along a slide bar 106 fixed to the frame on mounts 108 and 110. Opposite ends of the slide bar 106 are held on by allen bolts 110 and 112 which pass through respective mounting blocks 108 and 110.

Figures 11, 12:
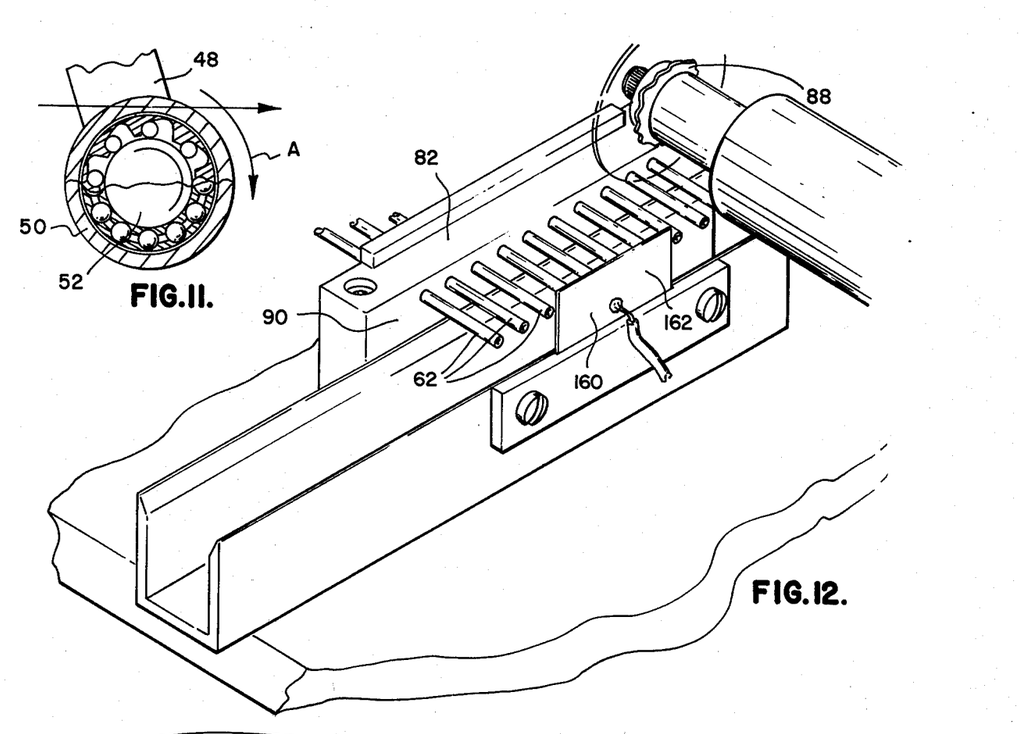
FIG. 11 is an enlarged fragmentary sectional view taken from the line 11—11 of FIG. 9.
FIG. 12 is a fragmentary perspective view showing the saw of the machine cutting off tubular silver as it extends from guide means and showing a limit switch adapted to deactivate the machine in the event that the saw blade is broken.

As shown in FIG. 5 of the drawings, the carriage 104 is provided with a flat bottom portion 112 which moves closely adjacent to an upper surface 114 of the frame 20 and thereby prevents the carriage from rotating on the bar 106 as the carriage slides back and forth laterally relative to the silver tubes 62 as shown in FIGS. 8 and 12 of the drawings.

A pulley 116 is fixed on the shaft 94 and engaging this pulley is a resilient belt 118 which also passes over a pulley 120 carried by the shaft 122 of the saw drive motor 124. This saw drive motor 124 is stationarily mounted on the frame 20 by means of a mount 126 and as the carriage 104 traverses the slide bar 106 the pulley 116 and the shaft 94 move to the broken line position as indicated in FIG. 5 of the drawings and it will be seen that the triangulation of the belt 118 is such that it must stretch and flex in order to maintain proper engagement with the pulleys 116 and 120 and also to maintain sufficient driving power for rotating the saw shaft 94.

Coupled to the carriage 104 is a bearing shaft or trunion 128 to which one end 130 of a connecting rod 132 is pivotably mounted. The connecting rod 132 is provided with an opposite end 134 rotatably mounted on a crank pin 136 of a crank disc 138 driven by a motor 140. As shown in FIG. 2 of the drawings, the motor 140 is provided with a sprocket 142 on its output shaft 144 and this sprocket corresponds to the sprocket 26 of the motor 22.

A sprocket similar to the sprocket 30 is mounted on a shaft 146 which carries the crank plate 138 and thus this crank plate 138 is operated in a manner similar to the plate 34 hereinbefore described.

As this plate 138 rotates it by means of the connecting rod 132 moves the carriage 104 back and forth on the bar 106 from the solid line position shown in FIG. 5 to the generally broken line position shown therein. A switch 148 is provided with a follower 150 adapted to follow the periphery of the crank plate 138 and this follower 150 may engage recess portions of 152 and 154 or other suitable irregularities around the periphery of the crank plate 138. The irregularities or recesses 152 and 154 being 180 degrees apart so as to interrupt the movement of the carriage at each end of its stroke so that as the saw 88 makes one pass and cuts all of the silver tubing extending through the receiver 82 the motor 22 may again be cycled to extend the silver tubing through the receiver 82 and to thereby dispose two more pieces of silver in the path of the saw so that it may be retracted in the opposite direction and thereby cut off ten pieces of silver tubing in one direction and then in moving in the backward direction cut off another 10 pieces. Thus the saw 88 cuts off all of the silver tubing extending from the delivery side 90 of the receiver 82 each time it passes either in a backward or forward direction with the axis of the saw moving laterally of the axes of the guides 80 and the openings 84 in the receiver 82. In this manner, the proceeding is adapted to cut off approximately 70,000 pieces of tubular silver in 1 hour's time.

It will be understood that the switches 96 and 148 automatically cycle the machine in such a manner that the motors 22 and 140 are operated in turn intermittently and in time with each other such that each motor is started and stoped precisely by means of the respective switches and electric brakes on the motors so that each motor may operate precisely one revolution of the respective crank plates 34 and 138 hereinbefore described.

Figure 13:
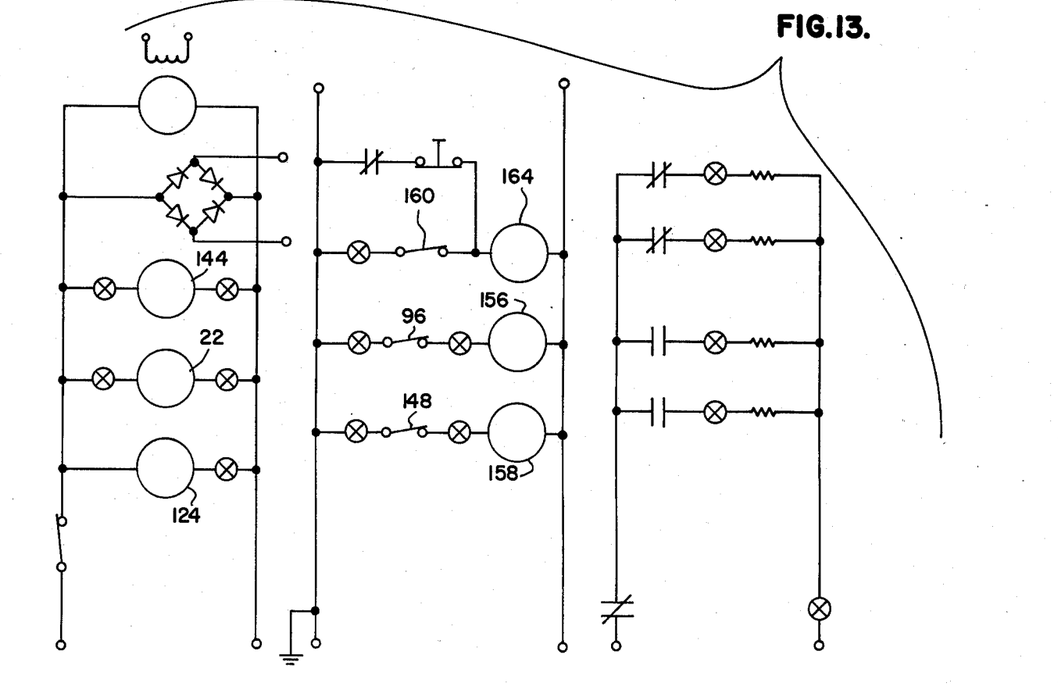
FIG. 13 is a diagrammatic view of the electrical wiring of the machine of the invention.

As shown in FIG. 13, it will be seen that the motor 22 and the motor 144 are controlled by the respective limit switches 96 and 148 and latching relays 156 and 158 are coupled in those areas with the switches 96 and 148 respectively and are such that they when energized hold the respective motor energized until the respective limit switch releases the relay and allows the motor to be de-energized upon completion of the cycle of operation of the respective motor as hereinbefore described.

Aslo shown in FIG. 13 is a broken blade wire stop emergency switch 160 which is automatically operable as shown in FIG. 12 of the drawings by means of the tubular silver 62 as it is fed from the delivery side 90 of the receiver 82.

The switch 160 is provided with a stop plate 162 adapted to be contacted by the ends of the tubular silver in the event they are not cut off by the saw 88 and, as shown in FIG. 12, the saw blade has been broken so that the periphery of the blade is broken away and does not contact the tubular silver and in that instance the silver will continue to project until the plate 162 and the switch 160 is contacted by the ends of the tubular silver and this activates a relay 164 which interrupts the entire circuit and stops operation of all of the motors 22, 124 and 144. At this time the saw blade needs to be replaced as hereinbefore described and in order to hold the carriage 104 in stationary position a spring loaded detent arm 166 is pivoted on a pin 168 and spring loaded by a spring 170 which forces a detent roller 172 into one of recesses 152 or 154 and thereby prevents the crank plate 138 and its shaft 146 from turning and holding the carriage 104 in position by means of the connecting rod 132.

It will be appreciated by those skilled in the art that various modifications may be resorted to without departing from the spirit of the invention.

I claim:

1. In a cutting machine: a frame; a material feed means adapted to feed a plurality of work pieces such as circular in cross section wire-like or tubular elements; said feed means having a plurality of elongated and substantially parallel material guides; each guide having an inlet end and an outlet end; an elongated feed roller having an axis of rotation disposed at substantially right angles relative to said guides; said feed roller having a peripheral portion provided with a plurality of annular driving grooves therein; said driving grooves having a depth less than the diameter of said work pieces; each of said driving grooves aligned with a respective one of said guides; a soft resilient idler roller having a peripheral portion closely adjacent said annular driving grooves of said feed roller; said peripheral portion of said idler roller adapted to engage said work pieces for holding them in firm engagement in said grooves of said feed roller; a receiver disposed to receive said work pieces from said feed roller; said receiver having a plurality of holes extending therethrough and adapted to receive and closely fit the exterior of said work pieces; intermittent drive means for intermittently rotating said feed roller a predetermined distance; a high speed rotary saw having a peripheral blade operable adjacent said receiver for cutting off predetermined lengths of work pieces adjacent thereto; said saw having an axis of rotation substantially parallel to said guide and adapted to rotate said saw in a plane at substantially right angles to said work pieces as they project from said receiver; means for rotating said saw at high speed; and actuating means for intermittently moving said saw in a direction at right angles to said guide means and said work pieces, projecting from said receiver.

2. The invention as defined in claim 1, wherein: further means is provided for sequencially and intermittently energizing said feed roller and said actuating means in timed relation to each other.

3. The invention as defined in claim 1, wherein: said means for rotating said saw at high speed comprising a motor stationarily mounted on said frame; a shaft carrying said saw; a pulley on said shaft; said motor having a shaft provided with a pulley and a stretch belt extending over both of said pulleys; said belt thus adapted to follow movement of said saw and its respective shaft when moved by said actuating means in a direction at right angles to said guides and said work pieces.

4. The invention as defined in claim 1, wherein: said feed roller is provided with a shaft having a sprag clutch driveably operable relative thereto; a lever arm adapted to operate said sprag clutch and a motor provided with an eccentrically driven linkage means connected to said lever for pivoting said lever back and forth; and means for adjusting the connection of the linkage on the lever so as to vary the angular travel of the lever and hence the degree of rotation of said sprag clutch to thereby control the intermittent lengths of work pieces projected by said feed roller through said guide then through said receiver so as to vary the length of said work pieces cut off by said saw.

5. The invention as defined in claim 1, wherein: said saw is provided with a supporting shaft; a carriage on which said shaft is journaled; a motor and linkage means coupled thereto; said linkage means coupled to said carriage and adapted to drive said carriage back and forth, in said direction at right angles to the axis of said shaft; and means for driving said shaft at high speed.

6. The invention as defined in claim 1, wherein: in a cutting machine: a frame; a material feed means adapted to feed a plurality of work pieces such as circular in cross section wire-like or tubular elements; said feed means having a plurality of elongated and substantially parallel material guides; each guide having an inlet end and an outlet end; an elongated feed roller having an axis of rotation disposed at substantially right angles relative to said guides; said feed roller having a peripheral portion provided with a plurality of annular driving grooves therein; said driving grooves having a depth less than the diameter of said work pieces; each of said driving grooves aligned with a respective one of said guides; a soft resilient idler roller having a peripheral portion closely adjacent said annular driving grooves of said feed roller; said peripheral portion of said idler roller adapted to engage said work pieces for holding them in firm engagement in said grooves of said feed roller; a receiver disposed to receive said work pieces from said feed roller, said receiver having a plurality of holes extending therethrough and adapted to receive and closely fit the exterior of said work pieces; intermittent drive means for intermittently rotating said feed roller a predetermined distance; a high speed rotary saw having a peripheral blade operable adjacent said receiver for cutting off predetermined lengths of work pieces adjacent thereto; said saw having an axis of rotation substantially parallel to said guide and adapted to rotate said saw in a plane at substantially right angles to said work pieces as they project from said receiver; means for rotating said saw at high speed; and actuating means for intermittently moving said saw in a direction at right angles to said guide means and said work pieces, projecting from said receiver; said means for rotating said saw at high speed comprising a motor stationarily mounted on said frame; a shaft carrying said saw; a pulley on said shaft; said motor having a shaft provided with a pulley and a stretch belt extending over both of said pulleys; said belt thus adapted to follow movement of said saw and its respective shaft when moved by said actuating means in a direction at right angles to said guides and said work pieces; said feed roller provided with a shaft having a sprag clutch driveably operable relative thereto; a lever arm adapted to operate said sprag clutch and a motor provided with an eccentrically driven linkage means connected to said lever for pivoting said lever back and forth; and means for adjusting the connection of the linkage on the lever so as to vary and angular travel of the lever and hence the degree of rotation of said sprag clutch to thereby control the intermittent lengths of work pieces projected by said feed roller through said guide then through said receiver so as to vary the length of said work pieces cut off by said saw; said saw provided with a supporting shaft; a carriage on which said shaft is journaled; a motor and linkage means coupled thereto; said linkage means coupled to said carriage and adapted to drive said carriage back and forth in said direction at right angles to the axis of said shaft; and means for driving said shaft at high speed.

7. The invention as defined in claim 5, wherein: detent means is provided for restraining said carriage in statioary position so as to permit removal of said saw from said shaft for replacing the same when the saw blade becomes broken.

8. The invention as defined in claim 1, wherein: said feed roller is adapted to be operated to feed said work pieces preliminary to a movement of said saw in one direction and again preliminary to the movement of said saw in the opposite direction whereby the saw cuts work pieces when moving in both directions laterally on its axis thereby moving to and fro and cutting a plutality of work pieces with each to and fro movement.

9. The invention as defined in claim 1, wherein: said guide tubular and closely fitting the cross section of said work pieces.

10. The invention as defined in claim 5, wherein: said linkage means comprises a motor driven eccentric having a connecting rod coupled thereto; said connecting rod pivotally mounted on said carriage.

11. The invention as defined in claim 10, wherein: said linkage means comprises a motor driven eccentric having a connecting rod coupled thereto; said connecting rod pivotally mounted on said carriage, said means for rotating said saw at high speed comprising a motor stationarily mounted on said frame; a shaft carrying said saw; a pulley on said shaft; said motor having a shaft provided with a pulley and a stretch belt extending over both of said pulleys; said belt thus adapted to follow movement of said saw and its respective shaft when moved by said actuating means in a direction at right angles to said guides and said work pieces.

12. The invention as defined in claim 1, wherein: a motor drives said feed roller and said actuating means for intermittently moving said saw in a direction at right angles of said guides; limit switches responsive to operation of said feed roller and to operation of said actuating means; latching relay means in circuit with said limit switches and said motors whereby a complete movement of said feed roller for feeding work pieces toward said saw energizes a latching relay to deenergize the motor operating said feed roller and to energize the motor operating said actuating means and such that the actuating means operating motor is energized until said actuating means completes its cycle of operation at which time it deenergizes said motor operable to move said actuating means and energizes said motor to operate said feed roller whereby said latching relays alternately operate in sequence automatically to alternately and intermittently energize said motors for operating said feed roller and said actuating means.

* * * * *